United States Patent

[11] 3,575,378

| [72] | Inventor | Donald G. Fawkes<br>Aurora, Ill. |
|---|---|---|
| [21] | Appl. No. | 834,402 |
| [22] | Filed | June 18, 1969 |
| [45] | Patented | Apr. 20, 1971 |
| [73] | Assignee | Henry Pratt Company |

[54] VALVE OPERATOR MECHANISM
17 Claims, 9 Drawing Figs.

[52] U.S. Cl. .................................................. 251/229,
251/233, 74/89.15, 74/504, 251/285
[51] Int. Cl. ..................................................... F16k 31/50
[50] Field of Search ........................................... 251/215,
229, 284, 285, 286, 291, 305; 74/89.14, 89.15,
504

[56] References Cited
UNITED STATES PATENTS

| 827,823 | 8/1906 | Starr | 251/285X |
| 2,835,268 | 5/1958 | Dillberg et al. | 251/305X |
| 3,063,298 | 11/1962 | Elliott | 251/229X |
| 3,385,120 | 5/1968 | Nott | 74/89.15X |
| 3,459,058 | 8/1969 | Fawkes | 74/89.15 |

*Primary Examiner*—William F. O'Dea
*Assistant Examiner*—David R. Matthews
*Attorney*—Hofgren, Wegner, Allen, Stellman and McCord

ABSTRACT: A valve operator wherein mechanism is provided for moving a valve member selectively between opened and closed positions. The valve member is provided with a valve shaft which is moved by a coupling connecting the valve shaft to a drive shaft which may be driven manually or by a motor as desired. The drive shaft is movably carried in a suitable support which is adjustably positioned and provided with associated stop means to coordinate the position of the drive shaft and valve shaft in at least one extreme position. The drive shaft carrying means may comprise a sleeve having an associated stop element at one end thereof for engagement by a stop element associated with the coupling means to provide the desired accurate positioning in the extreme position of the shafts. The sleeve may have a rough outer surface to permit infinite adjustability thereof in a fixed support.

Patented April 20, 1971
3,575,378
2 Sheets-Sheet 1
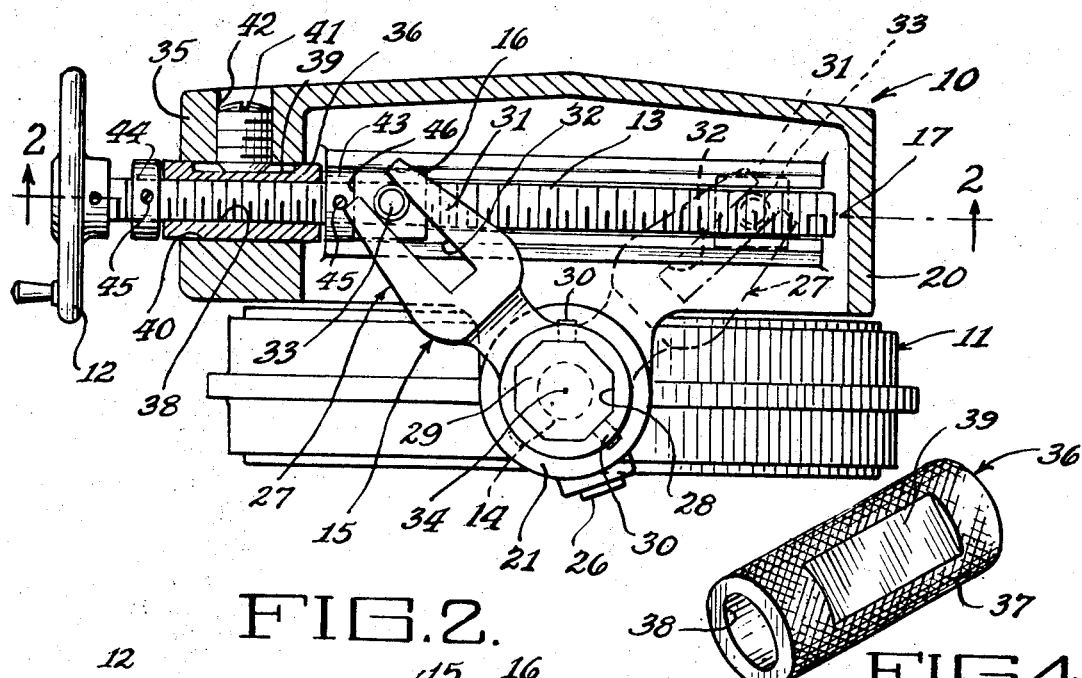
FIG.1.
FIG.2.
FIG.4.
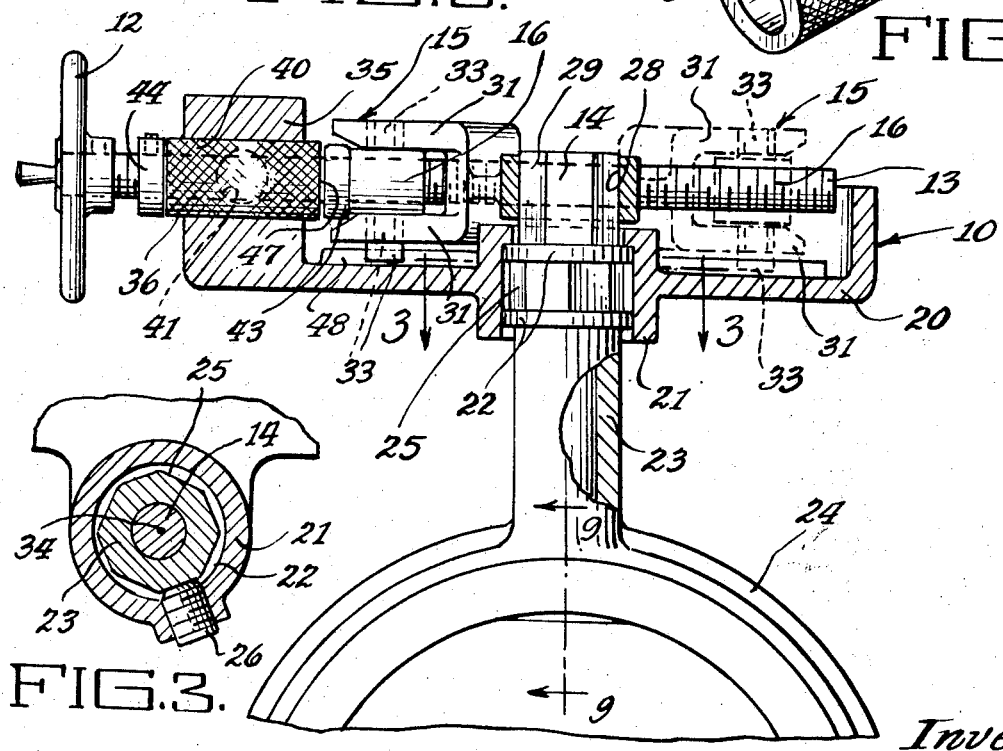
FIG.3.
Inventor
Donald G. Fawkes
By Hofgren, Wegner, Allen,
Stellman & McCord.
Attys.

VALVE OPERATOR MECHANISM

BACKGROUND OF THE INVENTION

1. Field of the Invention

This invention relates to valve operators.

2. Description of the Prior Art

In operating valves such as butterfly valves and the like, mechanical operators are utilized for providing relatively large amounts of torque for opening and closing the valves. It is highly desirable in such mechanisms to provide means for limiting the drive of the valve accurately to the closed position so as to preclude the valve from stopping short of the closed position and thereby permitting the valve to leak, or causing the valve to move past the desired closed position and thereby either overstress the valve or cause the valve to slightly open in the reverse direction and thereby leak. Conventionally, key and slot connections have been employed to arrange the mechanism with the desired relationship of the operator drive shaft to the valve shaft. Such key and slot connections have necessitated the use of relatively expensive jigs and the like for accurately locating the parts in making the connection. In addition to the relatively high cost, tolerances in the fit of the key and slot may permit some disalignment and, thus, such connecting means have not proven completely satisfactory.

One improved form of connector for connecting a valve operator to a valve member is shown in my U.S. Letters Pat. No. 3,395,886 which issued Aug. 6, 1968. In that patent, the valve shaft is connected to a connecting arm by means of a serrated, or knurled, sleeve which permits the connection between the valve shaft and drive shaft to be infinitely adjustable whereby the valve may be accurately positioned in the closed and opened positions to correspond to the limits of movement of the valve operator.

SUMMARY OF THE INVENTION

The present invention comprises a modified form of such valve operator connectors which provides improved simplicity and reduced cost of assembly, while yet permitting the user to obtain the highly accurate relative positioning of the valve and drive shaft members. The invention comprehends utilization of a sleeve member adjustably carrying the drive shaft of the operator and cooperating stop means, associated with the sleeve member and with the means coupling the drive shaft to the valve shaft, for accurately coordinating an extreme position, such as the closed valve position, of the valve member with an extreme position of the operator.

The sleeve member may be provided with a rough outer surface, such as by knurling, for positively locking the sleeve member in a fixed support portion of the operator. Means for engaging the rough surface with the fixed support may comprise threaded means. Illustratively, the threaded means may comprise setscrew means for forcing the rough surface against a confronting portion of the fixed support, clamp means for clamping the fixed support tightly about the sleeve, etc.

The invention further comprehends the provision in such a valve operator mechanism of means for coupling the valve shaft to the drive shaft having means for positioning the valve member in any one of a number of preselected different spaced positions relative to the coupling means. More specifically, the coupling means includes means for coupling the valve member in eight different angularly spaced positions.

BRIEF DESCRIPTION OF THE DRAWINGS

Other features and advantages of the invention will be apparent from the following description taken in connection with the accompanying drawings wherein:

FIG. 1 is a horizontal section of a valve operator mechanism embodying the invention associated with a butterfly valve;

FIG. 2 is a fragmentary vertical section thereof taken substantially along the line 2—2 of FIG. 1;

FIG. 3 is a fragmentary horizontal section taken substantially along the line 3—3 of FIG. 2;

FIG. 4 is an isometric view of the sleeve thereof;

DESCRIPTION OF THE PREFERRED EMBODIMENTS

Figure 9:
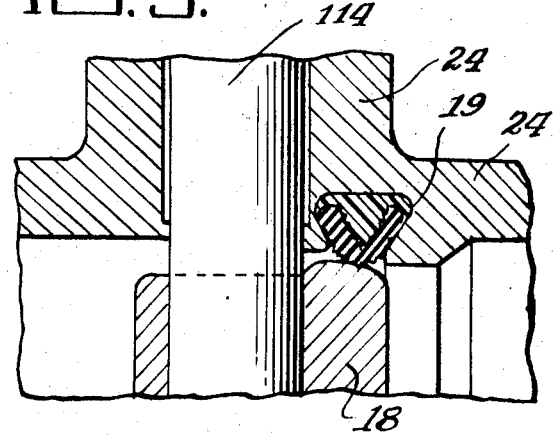
FIG. 9 is a fragmentary vertical section illustrating the closed arrangement of the valve.

In the exemplary embodiment of the invention as disclosed in FIGS. 1—4 and 9, a valve operator generally designated 10 is shown mounted on a valve generally designated 11 for operating the valve selectively between opened and closed positions. In the illustrated embodiment, the valve operator comprises a hand operated operator having a handwheel 12, it being understood that the operator may be provided with other suitable power inputs, such as motor drives (not shown) etc. As shown in FIG. 1, operator 10 includes a drive shaft 13 which is connected to the valve shaft 14 by a coupling generally designated 15. The drive shaft 13 illustratively herein comprises a threaded rod and the coupling 15 includes a nut 16 threaded on rod 13. The rod is axially fixed for rotation about its longitudinal axis 17 whereby the nut 16 is caused to move longitudinally along the rod 13 as the result of rotation of the rod about axis 17. Resultingly, rotation or rod 13 effects angular rotation of the valve shaft 14 to move the movable valve member 18 to and from the closed position relative to the valve seat 19 as shown in FIG. 9.

Valve operator 10 includes a housing 20 having an annular connector portion 21 angularly adjustably carried on a pair of spaced trunion collars 22 of a hub 23 on a valve body 24. As shown in FIG. 3, the hub 23, intermediate the collars 22, is provided with an octangular periphery 25 and annular connector portion 21 is provided with a setscrew 26 selectively engaging any one of the eight sides of octangular surface 25 for angularly adjustably positioning the operator 10 in any one of 45 degree spaced positions about the axis 34 of valve shaft 14.

Coupling 15 includes an arm 27 which is provided at one end with an octangular opening 28 fitted onto an octangular end portion 29 of the valve shaft 14 and secured thereto by a suitable setscrew 30. The arm 27 further includes a pair of vertically spaced bifurcated ends 31 defining slots 32. Nut 16 is provided with vertically oppositely projecting pin portions 33 slidably received in the slots 32 for translating movement of the nut 16 axially of rod 13 into swinging movement of the arm 27 about the axis 34 of the valve shaft 14.

Rod 13 is carried for rotation about its longitudinal axis 17 in a sleeve 36 carried by a fixed support portion 35 of housing 20. As shown in FIG. 4, the sleeve comprises a tubular element having a rough outer surface 37 which in the illustrated embodiment comprises a knurled surface. The sleeve is provided with a through axial bore 38 adapted to rotatably receive the rod 13 therethrough. The outer surface 37 is provided with a flat 39 elongated parallel to the axis of the sleeve. Fixed support portion 35 of housing 20 is provided with a bore 40 adapted to adjustably receive the sleeve 36 as shown in FIGS. 1 and 2. The sleeve 36 is infinitely adjustably secured in the bore 40 by threaded means which, as shown in FIG. 1, may comprise a setscrew 41 provided in a suitable threaded opening 42 in fixed support portion 35. The setscrew 41 engages the flat 39 of sleeve 36 to force the sleeve against the opposite wall of bore 40 to thereby cause the sleeve to be positively locked in the fixed support in the adjusted position.

Sleeve 36 is retained against axial movement relative to rod 13 by suitable retaining elements, such as collars 43 and 44 at the opposite ends of the sleeve. The collars may be fixed to the rod 13 by suitable screws 45. Bore 38 is preselected to permit free rotation of rod 13 therein while collars 43 and 44 prevent axial movement of the rod relative to the sleeve.

One surface 46 of nut 16 defines a first stop means which is movable in accordance with movement of the valve shaft 14 to engage an outer surface 47 of collar 43 which defines a cooperating second stop means limiting the movement of nut 16, and thus of valve shaft 14. Thus, when the nut 16 is in the leftmost position as shown in FIG. 1, the movable valve member 18 is accurately in the closed position as shown in FIG. 9. Nut 16 is guided in a rectilinear path aligned with the axis 17 of rod 13 by the lowermost pin portion 33 being slidably received in an upstanding guide 48 carried on the housing 20 as shown in FIG. 2. Thus, nut 16 is moved toward and from stop surface 47 in a rectilinear path to swing the arm 27 suitably to move the movable valve member 18 from and toward the closed position of FIG. 9. When the nut surface 46 abuts the collar surface 47, the valve member 18 is accurately in the seated closed position with the valve seat 19.

As discussed above, the closed position of the valve member may be coordinated with a preselected position of the operator, such as the position shown in FIG. 1 wherein the handwheel 12 is in a preselected extreme position. Where the drive means comprises an electric drive means, the extreme position may comprise the position wherein the drive motor is deenergized. To effect such a coordination between the extreme positions of the drive and valve shafts, the operator 10 is assembled to the valve 11 with the sleeve 36 roughly positioned as shown in the arrangement of FIG. 1. The rod 13 may then be suitably rotated to bring the valve member 18 to the closed position of FIG. 9. Should the nut stop surface 46 abut the collar stop surface 47 before the valve member reaches the fully closed position, the user merely loosens the sleeve (to the left as seen in FIG. 1) and upon resecuring of the sleeve, further operates the rod to move the valve member to the fully closed position. Should the valve member 18 reach the fully closed position before the nut stop surface 46 abuts the collar stop surface 47, the user merely readjusts the sleeve position to move the stop surface 47 to the right as seen in FIG. 1, to engage the surface 47 with the nut stop surface 46. With the sleeve loose in the support 35, the handwheel 12 may now be rotated to the desired extreme position thereof, such as the position shown in FIG. 1, and thereby move the rod 13 through the nut 16 without effecting movement of the valve shaft 14. The sleeve 36 is then fixedly secured in the support 35 with the surface 47 of collar 43 abutting the stop surface 46 of nut 16. Thus, the sleeve 36 may be accurately fixedly secured in support 35 with the stop surface 47 being accurately disposed to be engaged by the nut stop surface 46 when the valve member is accurately in the closed position of FIG. 9 and the handwheel is accurately in the position of FIG. 1.

Should it be desired to permit the valve shaft to rotate somewhat further, such as upon wear of the valve seat, to effect the desired closed condition of the valve, the sleeve 36 need merely be loosened in support 35 and moved suitably to the left as shown in FIG. 1 to permit the valve shaft to swing the additional amount necessary to again have fully seated relationship with the valve seat 19 while maintaining the coordinated relationship of the valve shaft position to the drive shaft position discussed above.

Figure 8:
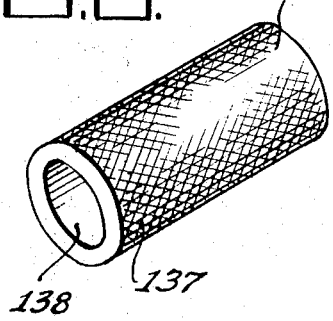
FIG. 8 is an isometric view of the sleeve thereof.

Referring now to the embodiment of FIGS. 5—8, a modified form of valve operator generally designated 110 is shown to comprise a valve operator generally similar to valve operator 10 except that the fixed support 135 is split at 149 to define a clamp receiving the sleeve 136. The split clamp portions may be drawn together by suitable threaded means such as bolt 150 and nut 151 to forcibly hold the sleeve in the adjusted position. As shown in FIG. 8, sleeve 136 is similar to sleeve 36 except that the roughened outer surface 137 is continuous.

Figure 5:
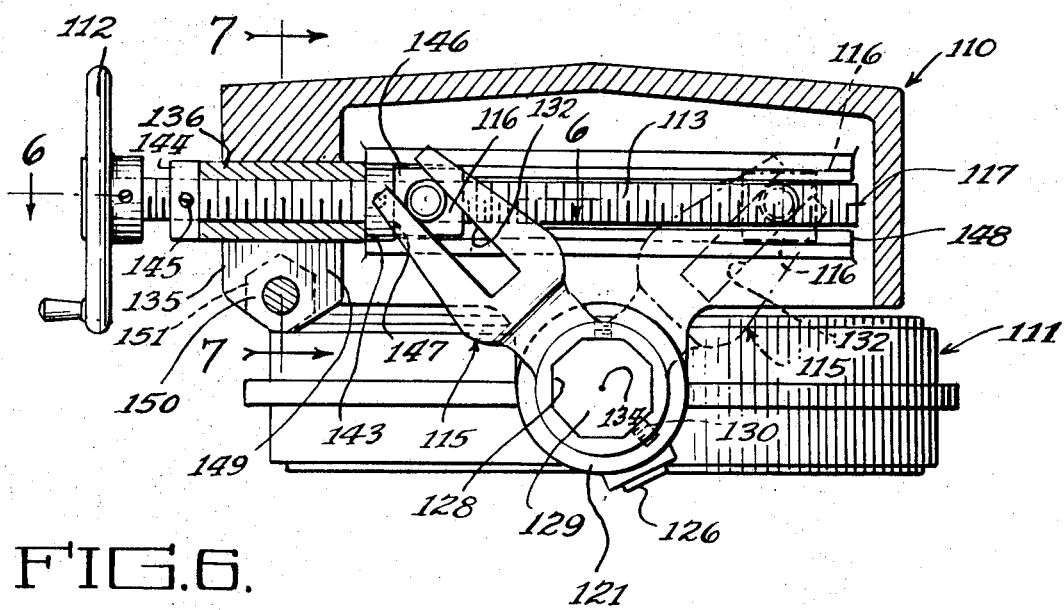
FIG. 5 is a horizontal section of a modified form of valve operator mechanism embodying the invention associated with a butterfly valve.
Figure 6:
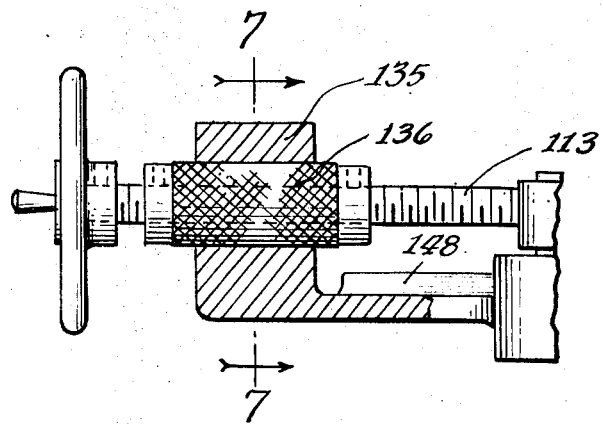
FIG. 6 is a fragmentary vertical section thereof taken substantially along the line 6—6 of FIG. 5.
Figure 7:
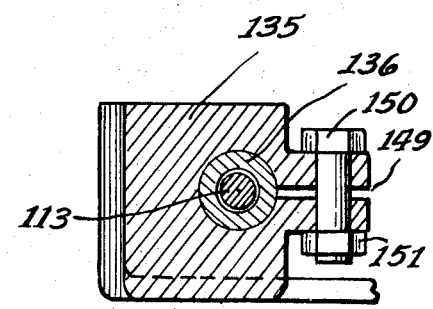
FIG. 7 is a fragmentary vertical section thereof taken substantially along the line 7—7 of FIG. 6.

Valve operator 110 in all other respects is similar to valve operator 10 and functions in a similar manner. Adjustment of the positioning of sleeve 136 in the fixed support 135 is effected by firstly roughly positioning the sleeve 136 as discussed above relative to sleeve 36 and adjusting the position thereof to the final desired position wherein the surface 146 of the nut 116 abuts the surface 147 of the collar 143 when the valve shaft 114 and the drive shaft 113 are at their extreme positions as shown in FIG. 5.

Portions of valve operator 110 corresponding to similar portions of valve operator 10 are identified by similar reference numerals but 100 higher.

In providing valve operators 10 and 110, the operators may be preassembled with the sleeves partially tightened to permit the desired adjustment of the sleeve position as discussed above. The octangular hub and housing connector portions 25,21 permit the operator to be mounted on the hub 23 in eight different spaced positions about the axis of the shaft for facilitated installation such as in close quarters. The assembly is readily effected by adjusting the different portions of the structure and securing the portions in the adjusted positions by the several setscrews and/or clamp discussed above. Thus, the installation may be readily made in the field and may be readily remade as discussed above where wear occurs in the valve. Further, ready replacement of one operator with another operator and simple adjustment of the replacement operator to coordinate the extreme position thereof with the closed position of the valve member may be readily effected. The means for providing the highly desirable adjustable coordination of the operator and valve member is extremely simple and economical of construction while yet providing the highly desirable features discussed above.

The foregoing disclosure of specific embodiments is illustrative of the broad inventive concepts comprehended by the invention.

I claim:

1. In a valve operator having a drive shaft for adjustably positioning a valve member carried by a valve shaft, mechanism for accurately controlling the limit of movement of said valve member comprising:

first support means for movably carrying the drive shaft;

second support means for movably carrying the valve shaft;

means for coupling said valve shaft to said drive shaft causing movement of the valve shaft to correspond to movement of the drive shaft;

first stop means movable in accordance with said movement of the valve shaft;

means adjustably fixing said first support means; and second stop means associated with said first support means to be engaged by said first stop means when said valve member is accurately in an extreme position.

2. The valve operator mechanism of claim 1 wherein said coupling means includes means for selectively connecting the valve shaft to the drive shaft in any one of a plurality of spaced positions.

3. The valve operator mechanism of claim 1 wherein said coupling means includes means for selectively connecting the valve shaft to the drive shaft in any one of a plurality of angularly spaced positions.

4. The valve operator mechanism of claim 1 wherein said coupling means includes an arm; means for connecting said arm to said valve shaft in any one of a plurality of spaced positions; and means movably connecting said arm to said drive shaft.

5. The valve operator mechanism of claim 1 wherein said second stop means comprises means fixed to said drive shaft.

6. The valve operator mechanism of claim 1 wherein said second stop means comprises means retaining said first support means against longitudinal movement relative to said drive shaft.

7. In a valve operator having a drive shaft for adjustably positioning a valve member carried by a valve shaft, mechanism for accurately controlling the limit of movement of said valve member comprising:

first support means for movably carrying the drive shaft, said support means including a fixed support, a sleeve movably carrying the drive shaft, and means adjustably fixing the sleeve to the fixed support;

second support means for movably carrying the valve shaft;

means for coupling said valve shaft to said drive shaft causing movement of the valve shaft to correspond to movement of the drive shaft;

first stop means movable in accordance with said movement of the valve shaft;

means adjustably fixing said first support means; and second stop means associated with said first support means to be engaged by said first stop means when said valve member and drive shaft are each accurately in an extreme position.

8. The valve operator mechanism of claim 7 wherein said first stop means comprises a surface portion of said coupling means.

9. The valve operator mechanism of claim 7 wherein said drive shaft comprises an axially fixed, threaded member rotatable about its longitudinal axis and said coupling means includes a nut threaded on said drive shaft and arm means connecting said nut to said valve shaft for turning said drive shaft as a result of rotation of said drive shaft about said axis.

10. The valve operator mechanism of claim 7 wherein said second stop means comprises surface means at one end of said sleeve.

11. The valve operator mechanism of claim 7 wherein said second stop means comprises a collar on said drive shaft at one end of said sleeve.

12. The valve operator mechanism of claim 7 wherein said first support means includes means clamping said sleeve in said fixed support.

13. The valve operator mechanism of claim 7 wherein said first support means includes a setscrew carried by said fixed support, and engaging said sleeve to lock said sleeve fixedly in any one of a plurality of positions in said fixed support.

14. The valve operator mechanism of claim 7 wherein said sleeve is provided with a high friction outer surface for positive locked engagement with said fixed support in any one of a plurality of positions.

15. The valve operator mechanism of claim 7 wherein said sleeve is provided with a rough outer surface for positive locked engagement with said fixed support in any one of a plurality of positions.

16. The valve operator mechanism of claim 7 wherein said first support means further includes means at opposite ends of said sleeve locking said sleeve against axial movement relative to said drive shaft while allowing rotation of said drive shaft about the longitudinal axis thereof.

17. The valve operator mechanism of claim 7 wherein said sleeve is provided with a rough outer surface for positive locked engagement with said fixed support in any one of a plurality of positions, said first support means including adjustable means for forcibly urging said rough outer surface against said fixed support.